United States Patent
Matsuda et al.

(10) Patent No.: US 6,927,784 B2
(45) Date of Patent: Aug. 9, 2005

(54) IMAGE DISPLAY SYSTEM, PROJECTOR, PROGRAM, INFORMATION STORAGE MEDIUM, AND IMAGE PROCESSING METHOD

(75) Inventors: Hideki Matsuda, Fujimi-machi (JP); Osamu Wada, Ina (JP)

(73) Assignee: Seiko Epson Corporation, Toyko (JP)

(*) Notice: Subject to any disclaimer, the term of this patent is extended or adjusted under 35 U.S.C. 154(b) by 456 days.

(21) Appl. No.: 10/254,501

(22) Filed: Sep. 26, 2002

(65) Prior Publication Data

US 2003/0058252 A1 Mar. 27, 2003

(30) Foreign Application Priority Data

Sep. 27, 2001 (JP) ........................................ 2001-296026

(51) Int. Cl.$^7$ ............................ G09G 5/00; G09G 5/10; G02F 1/1335
(52) U.S. Cl. ............................... 345/690; 345/7; 349/5; 353/25
(58) Field of Search ............................ 345/7, 690–697; 348/33.1; 349/5–10

(56) References Cited

U.S. PATENT DOCUMENTS

| | | | | |
|---|---|---|---|---|
| 5,315,378 A | * | 5/1994 | Satou et al. ................ | 348/655 |
| 6,043,797 A | * | 3/2000 | Clifton et al. ............... | 345/589 |
| 6,292,535 B1 | * | 9/2001 | Williams et al. ........... | 378/98.8 |
| 6,388,648 B1 | * | 5/2002 | Clifton et al. ................ | 345/88 |
| 6,445,815 B1 | * | 9/2002 | Sato .......................... | 382/154 |
| 6,636,229 B2 | * | 10/2003 | Ishikawa et al. ............ | 345/590 |
| 6,668,084 B1 | * | 12/2003 | Minami ...................... | 382/215 |

FOREIGN PATENT DOCUMENTS

| JP | 06-160845 | 6/1994 |
|---|---|---|
| JP | 09-197999 | 7/1997 |

* cited by examiner

*Primary Examiner*—Xiao Wu
*Assistant Examiner*—M. Fatahiyar
(74) *Attorney, Agent, or Firm*—Oliff & Berridge, PLC

(57) ABSTRACT

In order to provide an image display system, a projector, a program, an information storage medium, and an image processing method that make it possible to perform calibration without interrupting the display of an image for a presentation or the like, an image processing section of a projector is provided with an area identification section that identifies a display area and a non-display area, based on environmental information measured by a CCD sensor; a brightness change derivation section that derives any change in the brightness of the non-display area; a grayscale correction parameter derivation section that derives a grayscale correction parameter corresponding to the change in brightness; and a 1D-LUT generation section that generates a 1D-LUT used in the correction of brightness in accordance with the grayscale correction parameter.

10 Claims, 7 Drawing Sheets

IMAGE DISPLAY SYSTEM, PROJECTOR, PROGRAM, INFORMATION STORAGE MEDIUM, AND IMAGE PROCESSING METHOD

Japanese Patent Application No. 2001-296026, filed on Sep. 27, 2001, is hereby incorporated by reference in its entirety.

BACKGROUND OF THE INVENTION

The present invention relates to an image display system, a projector, a program, an information storage medium, and an image processing method that each correct an image from consideration of the effects of ambient light, to display the same.

From consideration of the effects of ambient light such as artificial light or external light, a calibration image is displayed before the start of a presentation or the like, the displayed calibration image is sensed (measured) by a sensor to capture the viewing environment, then the image is corrected for display.

However, even if calibration has been done before a presentation, changes in the ambient light such as artificial light or external light while the presentation is in progress will cause changes in the viewing environment, which could change the image appearance during the presentation.

In such a case, the presenter would not be able to interrupt the display of the presentation images to display a calibration image, so the images will continue to be displayed with inappropriate corrections.

For that reason, the people watching the presentation will sense that dark portions of the images will breakup or the colors of the images will become weaker, making the images difficult to see.

BRIEF SUMMARY OF THE INVENTION

The present invention was devised in the light of the above described technical problem. The present invention may provide an image display system, a projector, a program, an information storage medium, and an image processing method that make it possible to perform calibration without interrupting the normal image display, during the correction and display of an image from consideration of the effects of ambient light.

(1) In order to solve the above described technical problem, an image display system in accordance with the first aspect of the present invention relates to an image display system which corrects and displays an image, based on environmental information that represents a viewing environment, the image display system comprising:

correction display means for displaying a first calibration image, or input signal value calibration image, and also displaying a second calibration image represented by second image signal that is different from the first image signal;

sensor means for sensing the displayed first calibration image, the displayed second calibration image, and a display area of a normal image and a non-display area around the display area, and outputting first environmental information, second environmental information, and third environmental information, respectively;

area identification means for identifying the display area and the non-display area, based on the first environmental information and the second environmental information;

brightness change derivation means for storing one of the first and second environmental information of the non-display area as initial environmental information, and also for deriving brightness change information that expresses a change in brightness concomitant with a change in a viewing environment, based on a difference between the third environmental information and the initial environmental information;

grayscale correction parameter derivation means for deriving a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and correction data generation means for generating correction data which is used for correcting the brightness of an image, based on the grayscale correction parameter, wherein the grayscale correction parameter derivation means re-derives the grayscale correction parameter, based on the brightness change information, at a time-point at which a predetermined time has elapsed or a time-point at which a predetermined change has occurred in the third environmental information, wherein the correction data generation means regenerates the correction data, based on the grayscale correction parameter, and wherein the correction display means corrects and displays an image based on the correction data.

(2) According to the second aspect of the present invention, an image display system which corrects and displays an image, based on environmental information that represents a viewing environment, the image display system comprises:

a correction display section which displays a first calibration image represented by first image signal and also displays a second calibration image represented by second image signal that is different from the first image signal;

a sensor section which senses the displayed first calibration image, the displayed second calibration image represented by second image signal that is different from the first image signal, and a display area of a normal image and a non-display area around the display area, and outputs first environmental information, second environmental information, and third environmental information, respectively;

an area identification section which identifies the display area and the non-display area, based on the first environmental information and the second environmental information;

a brightness change derivation section which stores one of the first and second environmental information of the non-display area as initial environmental information, and also derives brightness change information that expresses a change in brightness concomitant with a change in a viewing environment, based on a difference between the third environmental information and the initial environmental information;

a grayscale correction parameter derivation section which derives a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and a correction data generation section which generates correction data which is used for correcting the brightness of an image, based on the grayscale correction parameter, wherein the grayscale correction parameter derivation section re-derives the grayscale correction parameter, based on the brightness change information, at a time-point at which a predetermined time has elapsed or a time-point at which a predetermined change has occurred in the third environmental information, wherein the correction data generation section regenerates the correction data, based on the grayscale correction parameter, and wherein the correction display section corrects and displays an image based on the correction data.

(3) According to the third aspect of the present invention, a projector which corrects and projects an image based on environmental information that represents a viewing environment, the projector comprises:

correction display means for displaying a first calibration image represented by first image signal and also projecting a second calibration image represented by second image signal that is different from the first image signal;

sensor means for sensing the displayed first calibration image, the displayed second calibration image represented by second image signal that is different from the first image signal, and a display area of a normal image and a non-display area around the display area, and outputting first environmental information, second environmental information, and third environmental information, respectively;

area identification means for identifying the display area and the non-display area, based on the first environmental information and the second environmental information;

brightness change derivation means for storing one of the first and second environmental information of the non-display area as initial environmental information, and also for deriving brightness change information that expresses a change in brightness concomitant with a change in a viewing environment, based on a difference between the third environmental information and the initial environmental information;

grayscale correction parameter derivation means for deriving a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and correction data generation means for generating correction data which is used for correcting the brightness of an image; based on the grayscale correction parameter, wherein the grayscale correction parameter derivation means re-derives the grayscale correction parameter, based on the brightness change information, at a time-point at which a predetermined time has elapsed or a time-point at which a predetermined change has occurred in the third environmental information, wherein the correction data generation means regenerates the correction data, based on the grayscale correction parameter, and wherein the correction display means corrects and projects an image based on the correction data.

(4) According to the fourth aspect of the present invention, a projector which corrects and projects an image based on environmental information that represents a viewing environment, the projector comprises;

a correction display section which displays a first calibration image represented by first image signal and also projects a second calibration image represented by second image signal that is different from the first image signal;

a sensor section which senses the displayed first calibration image represented by first image signal, the displayed second calibration image represented by second image signal that is different from the first image signal, and a display area of a normal image and a non-display area around the display area, and outputs first environmental information, second environmental information, and third environmental information, respectively;

an area identification section which identifies the display area and the non-display area, based on the first environmental information and the second environmental information;

a brightness change derivation section which stores one of the first and second environmental information of the non-display area as initial environmental information, and also derives brightness change information that expresses a change in brightness concomitant with a change in a viewing environment, based on a difference between the third environmental information and the initial environmental information;

a gray scale correction parameter derivation section which derives a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and a correction data generation section which generates correction data which is used for correcting the brightness of an image, based on the grayscale correction parameter, wherein the grayscale correction parameter derivation section re-derives the grayscale correction parameter, based on the brightness change information, at a time-point at which a predetermined time has elapsed or a time-point at which a predetermined change has occurred in the third environmental information, wherein the correction data generation section regenerates the correction data, based on the grayscale correction parameter, and wherein the correction display section corrects and projects an image based on the correction data.

(5) A program according to the fifth aspect of the present invention relates to a program for correcting and displaying an image, based on environmental information that represents a viewing environment, wherein the program causes a computer to function as:

display control means for causing a display of a first calibration image represented by first image signal on an image display means and also causing a display of a second calibration image represented by second image signal that is different from the first image signal on the image display means;

sensor control means for causing a sensing of the first and second calibration images together with a display area of a normal image and a non-display area around the display area by a sensor means, and causing an output of first environmental information, second environmental information, and third environmental information, to the sensor means;

area identification means for identifying the display area and the non-display area, based on the first environmental information and the second environmental information;

brightness change derivation means for storing one of the first and second environmental information of the non-display area as initial environmental information, and also for deriving brightness change information that expresses a change in brightness concomitant with a change in a viewing environment, based on a difference between the third environmental information and the initial environmental information;

grayscale correction parameter derivation means for deriving a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and correction data generation means for generating correction data which is used for correcting the brightness of an image, based on the grayscale correction parameter, wherein the grayscale correction parameter derivation means re-derives the grayscale correction parameter, based on the brightness change information, at a time-point at which a predetermined time has elapsed or a time-point at which a predetermined change has occurred in the third environmental information, wherein the correction data generation means regenerates the correction data, based on the gray scale correction parameter, and wherein the display control means corrects the image, based on the correction data, and causes the display thereof on the image display means.

(6) An information storage medium according to the sixth aspect of the present invention relates to an information storage medium that can be read by a computer, which stores a program for causing a computer to function as the above described means.

The present invention makes it possible to display an image of a brightness that is appropriate for changes in the viewing environment, without interrupting the normal image display for the presentation or the like or displaying a calibration image during the presentation or the like, by identifying the display area and the non-display area and correcting the correction data for brightness in accordance with a change in brightness of the non-display area.

When applied to a projector, the present invention makes it possible to correct the brightness of an image as appropriate, without interrupting the projection of the normal image, when using a projector that is readily affected by ambient light.

Note that the difference corresponds to a numerical difference or a ratio, by way of example. The correction data correspond to a one-dimensional look-up table (ID-LUT) or a matrix, by way of example.

(7) In this image display system, projector, program, or information storage medium, the brightness change derivation means may use a non-display area above the display area, as the non-display area.

This makes it possible to perform more accurate brightness correction, reducing the effects of noise, by using a non-display area above the display area into which external objects such as the hands of the presenter are unlikely to intrude.

(8) An image processing method according to the seventh aspect of the present invention relates to an image processing method of correcting the image, based on environmental information that represents a viewing environment, the image processing method comprising:

displaying a first calibration image represented by first image signal;

sensing the displayed calibration image and outputting the result as first environmental information;

displaying a second calibration image represented by second image signal that is different from the first image signal;

sensing the displayed calibration image and outputting the result as second environmental information;

identifying a display area and a non-display area, based on the difference between the first and second environmental information;

storing one of the first and second environmental information of the non-display area in a predetermined storage region as initial environmental information;

deriving a grayscale correction parameter, based on an average luminance value of each pixel in the display area during the displays of the first and second calibration images in an ideal environment and an average luminance value of each pixel in the display area during the displays of the first and second calibration images in the actual environment;

generating correction data based on the grayscale correction parameter;

correcting the image data to display a normal image, based on the correction data;

sensing the displayed normal image and outputting the result as third environmental information;

deriving brightness change information that represents a change in brightness concomitant with a change in the viewing environment, based on the third environmental information for the non-display area during the display of the normal image and the initial environmental information, at a time-point at which a predetermined time has elapsed or a time-point at which a predetermined change has occurred in the third environmental information;

re-deriving the grayscale correction parameter, based on the brightness change information;

regenerating the correction data, based on the grayscale correction parameter; and displaying corrected image data, based on the correction data.

The present invention makes it possible to display an image of a brightness that is appropriate for changes in the viewing environment, without interrupting the normal image display for the presentation or the like or displaying a calibration image during the presentation or the like, by identifying the display area and the non-display area and correcting the correction data for brightness in accordance with a change in brightness of the non-display area.

(9) With the image processing method, the non-display area may be a non-display area above the display area.

This makes it possible to perform more accurate brightness correction, reducing the effects of noise, by using a non-display area above the display area into which external objects such as the hands of the presenter are unlikely to intrude.

DETAILED DESCRIPTION OF THE EMBODIMENT

The description of the present invention that follows relates to the application thereof to an image display system that uses a liquid-crystal projector that is one type of projection display system, with reference to the accompanying figures. Note that the embodiments described hereunder do not in any way limit the scope of the invention laid out herein. Note also that the entirety of the configuration described with reference to these embodiments does not limit the components essential to the means of the present invention.

Description of Overall System

Figure 1:
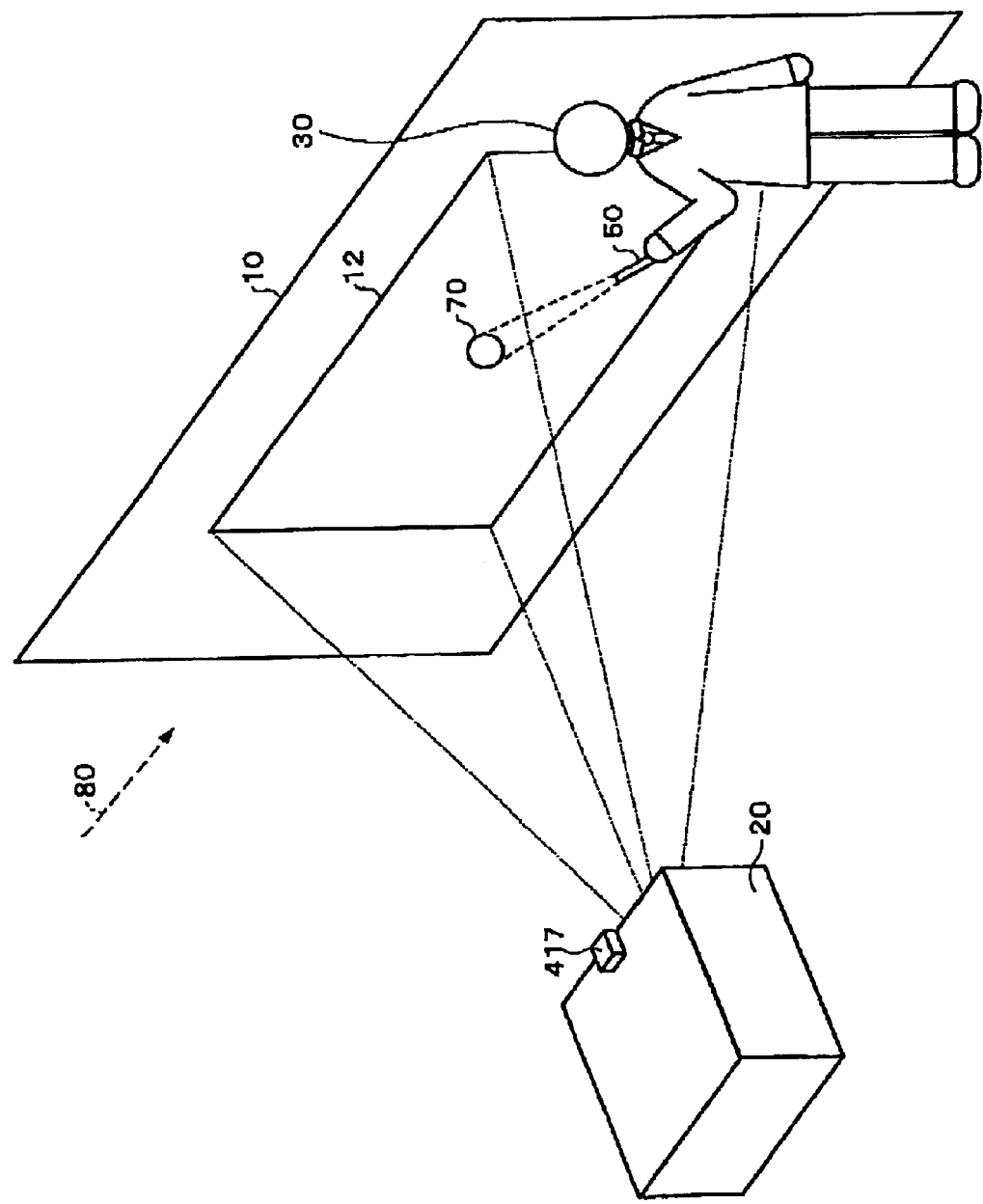
FIG. 1 is a schematic illustrative view of an image display system in accordance with an example of this embodiment of the present invention.

A schematic illustrative view shown in FIG. 1 is of an image display system in accordance with an example of this embodiment of the present invention.

A projector 20 that is provided substantially facing a screen 10 projects an image for a predetermined presentation. A presenter 30 gives a presentation to an audience, while using a light spot 70 projected from a laser pointer 50 to point at a desired position-of an image in an image display region 12, which is a display area on the screen.

During such a presentation, the image appearances on the image display region 12 will vary greatly, depending on the ambient light 80. Even when the same white is displayed, for example, it could seem to be a bright white or a dull white it the ambient light 80 differs.

For that reason, before projecting the presentation image, the projector 20 projects a calibration image of predetermined colors (such as red, green, blue, and white if it is an RGB display) for each predetermined grayscale, or input signal value, a COD sensor 417 senses that image to measure the calibration image and capture the viewing environment, and correction data is corrected in accordance with the effects of the viewing environment, to display a corrected image.

If the presentation takes along time, however, the ambient light 80 might change and it could happen that the initially generated correction data is no longer suitable for the actual viewing environment.

If correction data that is not suitable for the actual viewing environment is used for correcting the image, it will not be possible to reproduce details such as image brightness accurately, and the image will become difficult to see.

This embodiment of the invention employs a method that corrects the correction data in accordance with changes in brightness of a non-display area around the image display region 12 on the screen 10.

The description now turns to the functional blocks of the image processing section within the projector 20, for implementing the above functions.

Figure 2:
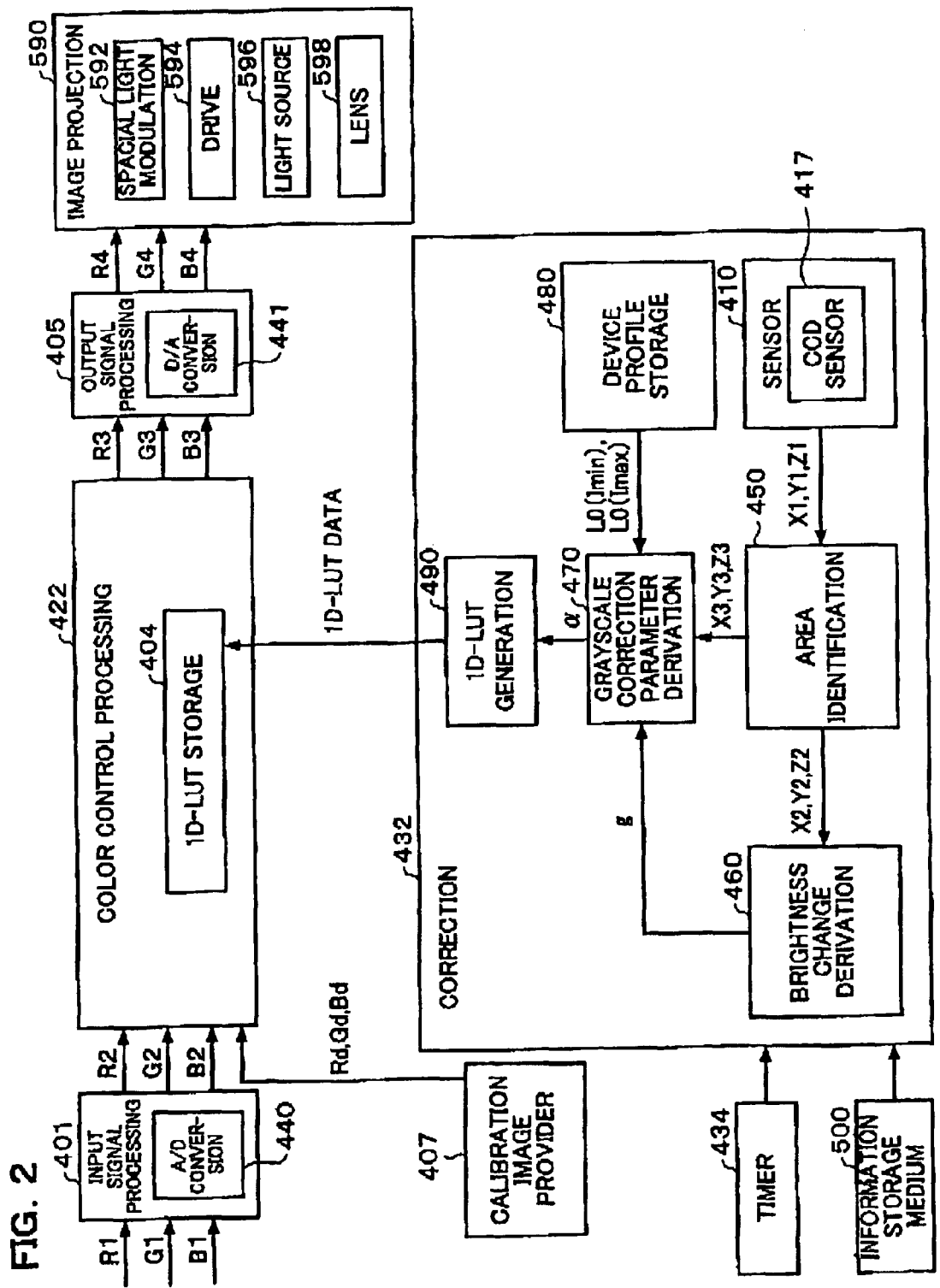
FIG. 2 is a functional block diagram of the image processing section within the projector in accordance with an example of this embodiment.

A functional block diagram of the image processing section within the projector 20 in accordance with an example of this embodiment is shown in FIG. 2.

The image processing section comprises an input signal processing section 401 to which RGB signals are input, a color control processing section 422, a correction section 432, an output signal processing section 405, and an image projection section 590 that is part of the correction display means.

The input signal processing section 401 comprises an A/D conversion section 440 that converts R1, G1, and B1 analog signals into R2, G2, and B2 signals.

The color control processing section 422 functions as part of a correction display means and comprises a one-dimensional look-up table (1D-LUT) storage section 404 for one type of correction data used in correcting the brightness of an image.

The correction section 432 comprises a sensor section 410; an area identification section 450 that distinguishes between a display area and a non-display area, based on environmental information from the sensor section 410; a brightness change derivation section 460 that derives a change in brightness in the non-display area; a grayscale correction parameter derivation section 470 that derives a grayscale correction parameter; a device profile storage section 480; and a 1D-LUT generation section 490 that acts as a correction data generation means to generate 1D-LUT data.

The image projection section 590 comprises a special light modulator 592 configured of a liquid crystal panel or the like; a drive section 594 that drives the special light modulator 592, based on an R4 signal, a G4 signal, and a B4 signal from the output signal processing section 405; a light source 596 that outputs light to the special light modulator 592; and a lens 598 that projects the light converted by the special light converter 592.

An image projection section 590 projects an image based on the R4 signal, G4 signal, and B4 signal.

The sensor section 410 that determines the viewing environment comprises the CCD sensor 417 that senses the screen 10, and it outputs environmental information based on the result of the sensing. Note that XYZ values (X1, Y1, Z1) that express color as numerical values are used in this embodiment as the environmental information, as an international standard.

Figure 6:
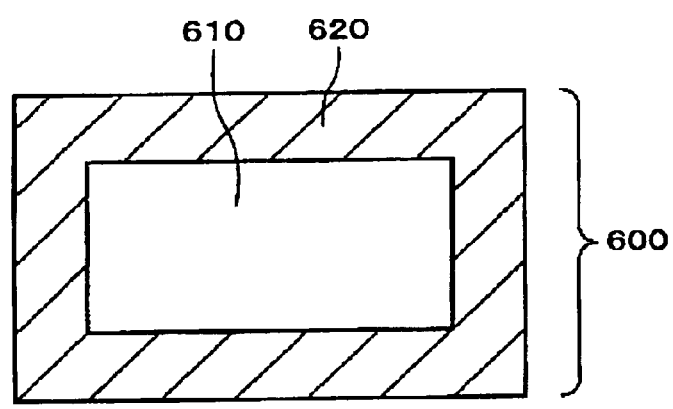
FIG. 6 is illustrative of the areas captured by the CCD sensor.

The areas captured by the CCD sensor 417 are as shown in FIG. 6.

In the description below, the environmental information (X1, Y1, Z1) is environmental information corresponding to a total area 600 captured by the CCD sensor 417. This is obtained as outputs for each individual pixel of the CCD sensor 417. The total area 600 captured by the CCD sensor 417 comprises a non-display area 620 and a display area 610, as will be described later. Environmental information (X2, Y2, Z2) is the part of the environmental information (X1, Y1, Z1) that relates to the non-display area 620. Similarly, environmental information (X3, Y3, Z3) is the part of the environmental information (X1, Y1, Z1) that relates to the display area 610.

Processing Flow

The description now turns to the flow of image processing, using these components.

Figure 3:
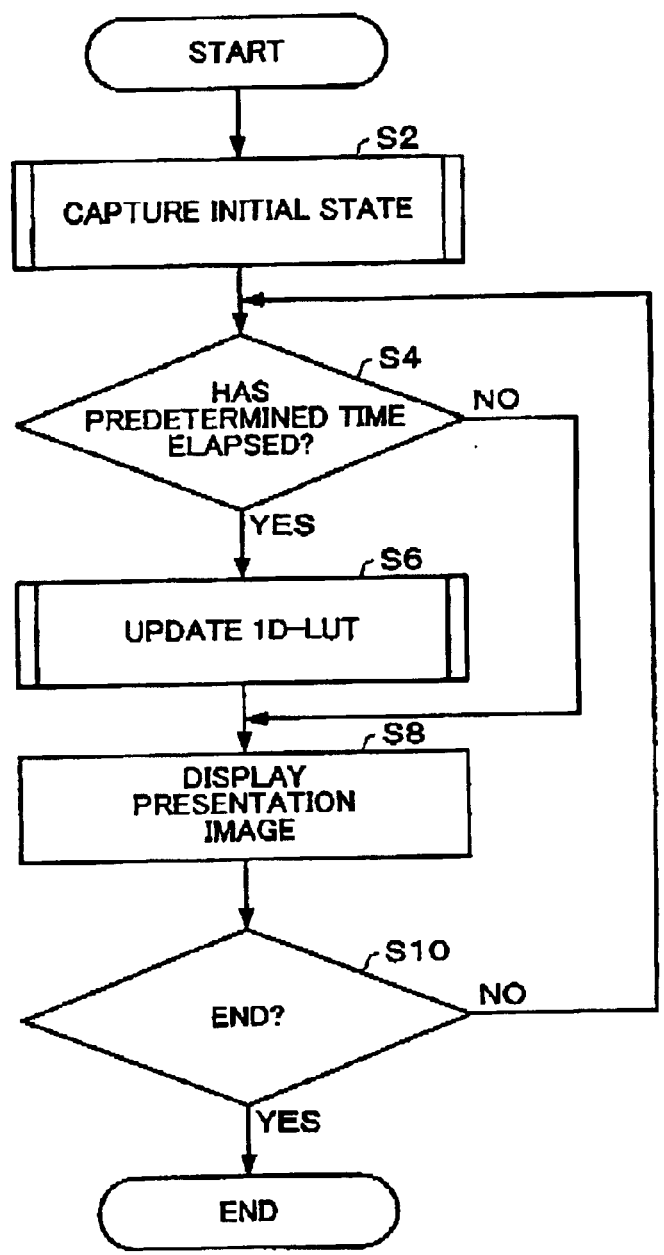
FIG. 3 is a flowchart of image processing in accordance with an example of this embodiment.

The flowchart shown in FIG. 3 is of the flow of image processing in accordance with an example of this embodiment.

The projector 20 first measures an initial state (step S2). More specifically, the projector 20 projects a calibration image onto the screen 10, then determines the initial state based on environmental information from the sensor section 410.

At this point, the description specifically relates to the flow of processing for determining the initial state.

Figure 4:
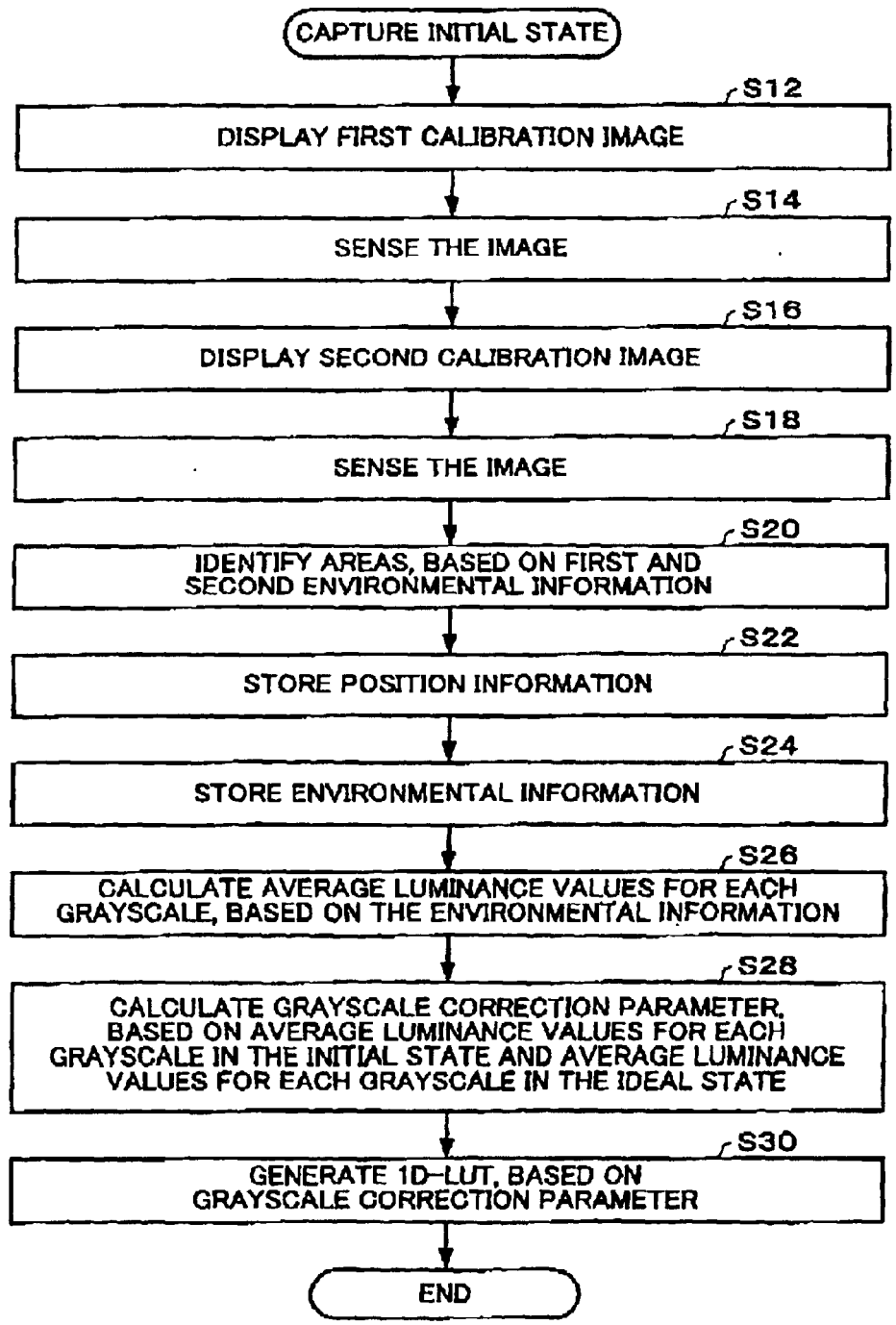
FIG. 4 is a flowchart of the processing for capturing the initial state in accordance with an example of this embodiment.

The flowchart shown in FIG. 4 is of the flow of processing for determining the initial state, in accordance with an example of this embodiment, Within the projector 20, the color control processing section 422 corrects a first image signal (Rd, Gd, Bd) from the calibration image provider section 407, a drive section 594 drives the special light modulator 592, and light from the light source 596 passes through the special light modulator 592 and the lens 598 to project a first calibration image (step S12).

The CCD sensor 417 senses that calibration image (step S14). The sensor section 410 outputs first environmental information to the area identification section 450, based on that sensing result.

The color control processing section 422 of the projector 20 corrects a second image signal (Rd', Gd', Bd') from the calibration image provider section 407, the drive section 594 drives the special light modulator 592, and light from the light source 596 passes through the special light converter 592 and the lens 598 to project a second calibration image (step S16).

The CCD sensor 417 then senses that calibration image (step S18). The sensor section 410 outputs second environmental information to the area identification section 450, based on that sensing result.

The area identification section 450 identifies the display area 610 and the non-display area 620, based on the first and second environmental information (step S20). More specifically, the area identification section 450 obtains the difference between the first and second environmental information (XYZ values) for each pixel. Then, the area identification section 450 determines that a pixel is within in the non-display area 620 in the case where the difference at the pixel is less than a predetermined threshold value. The area identification section 450 recognizes that a pixel is within the display area 610 in the case where the difference at the pixel equal to or greater than the threshold value.

The area identification section 450 stores position information for the display area 610 and the non-display area 620 (step S22).

The area identification, section 450 also outputs the second environmental information (X2, Y2, and Z2, but the first environmental information could also be used) of the non-display area 620 to the brightness change derivation section 460 (step S24).

In this case, it is preferable the area of the screen 10 that is above the image display region 12 of the display area 610 is used as the non-display area 620.

This is because there is a danger that the CCD sensor 417 might sense the presenter 30, the laser pointer 50, or shadows thrown thereby within areas below and to the sides of the image display region 12, which would introduce noise into the environmental information.

The area identification section 450 outputs the first and second environmental information (X3, Y3, Z3) to the grayscale correction parameter derivation section 470.

The grayscale correction parameter derivation section 470 calculates average luminance values, based on the first and second environmental information (step S26). In this case, of the first image signal and the second image signal, it is assumed that a lower average luminance value is L(Imin) and a higher average luminance value is L(Imax).

The device profile storage section 480 transfers the above described lower-average luminance value in an ideal state (L0(Imin)) and the higher-average luminance value in an ideal (L0(Imax)) to the grayscale correction parameter derivation section 470.

The grayscale correction parameter derivation section 470 calculates a grayscale correction parameter α, based on each grayscale average luminance value (L(Imin) and L(Imax)) in the initial state and each grayscale average luminance value (L0(Imin) and L0(Imax)) in the ideal state (step S28).

Note that the grayscale average luminance values (L0(Imin)) and L0(Imax)) in the ideal state are transferred by the device profile storage section 480 to the grayscale correction parameter derivation section 470.

The specific calculation equation that is used in this case is: $\alpha=(L0(Imax)/L0(Imin))/(L(Imax)/L(Imin))-1$.

The 1D-LUT generation section 490 that functions as a correction data generation means generates 1D-LUT data based on the grayscale correction parameter a from the grayscale correction parameter derivation section 470, and transfers it to the 1D-LUT storage section 404 (step S30).

The process of capturing the initial state is done in this manner.

The input signal processing section 401, to which the image signals (R1, G1, B1) for displaying the presentation image are input, uses the A/D conversion section 440 to convert those image signals into image data (R2, G2, B2) in digital form.

A timer section 434 always determines whether or not a predetermined time has elapsed after the start of the presentation (step S4).

If the predetermined time has not elapsed, the color control processing section 422 corrects the image brightness, based on the image data (R2, G2, B2) from the input signal processing section 401 and the generated 1D-LUT that is stored in the 1D-LUT storage section 404, then outputs post-calibration image data (R3, G3, B3) to the output signal processing section 405.

Note that in practice the color control processing section 422 does not base the correction of the image brightness on the brightness of the image but on the environmental information from the sensor section 410.

The output signal processing section 405 uses a D/A conversion section 441 for conversion into analog signals (R4, G4, and B4).

The drive section 594 drives the special light modulator 592, based on the analog signals (R4, G4, and B4), and the image projection section 590 projects light from the light source 596 through the special light modulator 592 and the lens 598.

The thus-configured projector 20 projects the presentation image (step S8).

If the timer section 434 determines that the predetermined time has elapsed since the start of the presentation, it outputs a control signal to the sensor section 410 to update the 1D-LUT in the grayscale correction parameter derivation section 470.

The description now turns to the 1D-LUT update processing (step S6).

Figure 5:
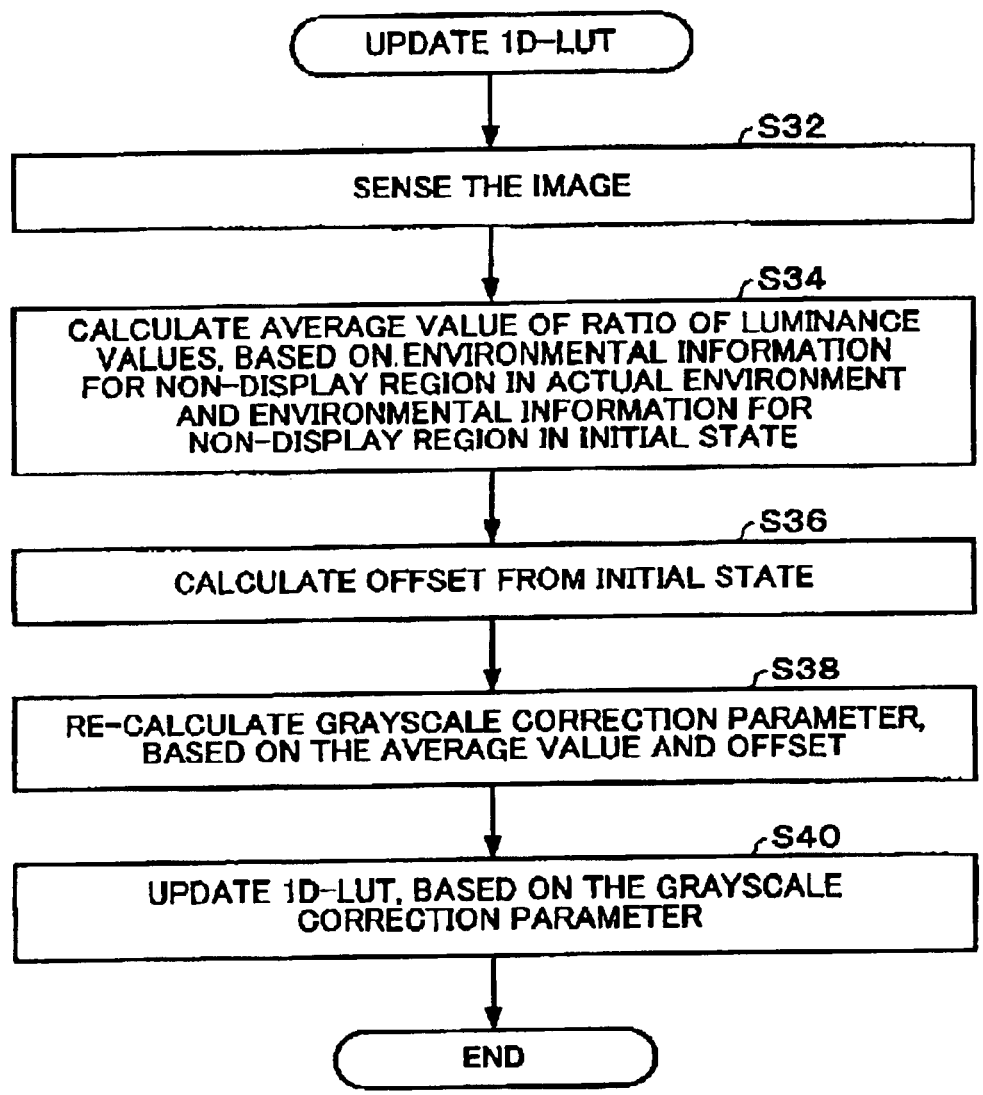
FIG. 5 is a flowchart of the processing for updating the 1D-LUT in accordance with an example of this embodiment.

The flowchart shown in FIG. 5 is of the flow of processing during 1D-LUT update in accordance with an example of this embodiment.

The sensor section 410 senses the screen 10, based on the control signal from the timer section 434 (step S32). The sensor section 410 calculates the newly sensed environmental information (X1', Y1', Z1') and passes it to the area identification section 450.

The brightness change derivation section 460 averages the ratio of the luminance values in the initial state and the luminance values obtained by the current sensing, over the non-display area 620, based on environmental information (X2', Y2', Z2') for the non-display area 620 that is derived from (X1', Y1', Z1') by the area identification section 450 and the environmental information (X2, Y2, Z2) for the non-display area 620 in the initial state that was stored in step S24. Assume that this average of the ratio of luminance values is g (step S34). Note that the ratio of luminance values can be obtained by calculating Y2'/Y2 for each pixel (or for each block of a plurality of pixels).

The grayscale correction parameter derivation section 470 calculates an offset b from the initial state (step S36). The grayscale correction parameter derivation section 470 calculates the offset b from the simultaneous equations L(Imin)=a(Imin/255)$^\gamma$+b and L(Imax)=a(Imax/255)$^\gamma$+b.

Note that $\gamma$ is the gamma value, which is constant. If there is no effect due to ambient light, the offset b is taken to be zero.

The grayscale correction parameter derivation section 470 re-calculates the grayscale correction parameter $\alpha$, based on the average value g of the ratio of luminance values from the brightness change derivation section 460 and the offset b from the initial state (step S38).

The specific equation used for the calculation is: $\alpha$=(L0(Imax)/L0(Imin))/((L(Imax)+(g−1)b)/(L(Imin)+(g−1)b))−1. In other words, the new environment calibration parameter is obtained from consideration of the change in brightness ((g−1)b), in comparison with the first environment calibration parameter.

The 1D-LUT generation section 490 re-generates the 1D-LUT data based on the new environment calibration parameter $\alpha$, and updates the 1D-LUT in the 1D-LUT storage section 404 (step S40).

The projector 20 continues the processing of steps S4 to S8 up until the end of the presentation (step S10). Note that the timer section 434 determines the passage of the second and subsequent predetermined times every five minutes after the start of the presentation, which is the predetermined time interval.

The description now turns to a specific example of the method of generating the 1D-LUT data from the grayscale correction parameter $\alpha$.

First of all, the 1D-LUT generation section 490 performs the calculations of Equation 1 and Equation 2 below, to derive $\gamma'$ (gamma value) that represents the post-correction luminance change characteristic from $\gamma$ (gamma value) that represents the original luminance change characteristic, using the grayscale correction parameter $\alpha$.

$$\Delta\gamma = -\frac{h\alpha}{1+|h\alpha|}(\gamma - \gamma_{min}) \quad \text{Equation 1}$$

$$\gamma' = \Delta\gamma + \gamma \quad \text{Equation 2}$$

In Equation 1, h and $\gamma_{min}$ are constants. As shown by Equations 1 and 2, the gamma value that represents the luminance change characteristic is obtained as a function of the grayscale correction parameter $\alpha$.

The 1D-LUT generation section 490 uses the thus-obtained post-correction gamma value $\gamma'$ to obtain an output luminance value L3 corresponding to each of a plurality of input luminance values L2, by using Equation 3 below.

$$L3 = k \times W\text{max}1 \times \left(\frac{L2}{k}\right)^\gamma \quad \text{Equation 3}$$

In Equation 3, k is a normalized constant, where k is 1023 (which is the possible maximum value for the L2 signal and the L3 signal) when the L2 signal and the L3 signal are each 10 bits. Wmax1 is a predetermined parameter.

The 1D-LUT generation section 490 stores the correspondences between the input luminance values L2 and the output luminance values L3 within memory (not shown in the figure) in the 1D-LUT storage section 404. The data in this memory is equivalent to 1D-LUT data. If an input luminance value L2 is given as address data in this memory in this case, the corresponding output luminance value L3 is output. Luminance values that have not been stored can be obtained by interpolation from a plurality of the luminance values that are stored.

An example of the operation of the color control processing section 422 during actual image projection is described below. The color control processing section 422 uses the 1D-LUT that is stored in the 1D-LUT storage section 404 to first obtain an input luminance value L2 from the input color signals (R2, G2, and B2), in accordance with Equation 4.

$$L2 = l \times R2 + m \times G2 + n \times B2 \quad \text{Equation 4}$$

In the above equation, l, m, and n are predetermined constant, such as: l=0.30, m=0.59, and n=0.11.

The color control processing section 422 gives the thus-obtained input luminance value L2 as address data to the 1D-LUT storage section 404, to obtain the output luminance value L3. The color control processing section 422 multiplies the input color signals (R2, G2, and B2) with the ratio of the output luminance L3 corresponding to the input luminance value L2, using Equations 5 to 7, and outputs converted color signals (R3, G3, and B3).

$$R3 = \frac{L3}{L2}R2 \quad \text{Equation 5}$$

$$G3 = \frac{L3}{L2}G2 \quad \text{Equation 6}$$

$$B3 = \frac{L3}{L2}B2 \quad \text{Equation 7}$$

If the projector 20 has a 1D-LUT for each of the color signals (that is, for the R2 signal, the G2 signal, and the B2 signal), each of these 1D-LUTs could be updated as described below.

The 1D-LUT generation section 490 uses the gamma value $\gamma'$ derived from Equation 1 and Equation 2 and perform the calculations of Equations 8, 9, and 10 to obtain the output color signals R3, G3, and B3.

$$R3 = k \times W\text{max}2 \times \left(\frac{R2}{k}\right)^{\gamma'} \quad \text{Equation 8}$$

$$G3 = k \times W\text{max}2 \times \left(\frac{G2}{k}\right)^{\gamma'} \quad \text{Equation 9}$$

$$B3 = k \times W\text{max}2 \times \left(\frac{B2}{k}\right)^{\gamma'} \quad \text{Equation 10}$$

In Equations 8, 9, and 10, k is a normalized constant, where k is 1023 when the R2 signal, the R3 signal, the G2 signal, the G3 signal, the B2 signal, and the B3 signal are each 10 bits (and each signal value is at the maximum). Wmax2 is a predetermined parameter.

The 1D-LUT generation section 490 stores the correspondence between R2 and the value for R3 calculated from Equation 8 in memory (not shown in the figure) within the 1D-LUT storage section 404. This data stored in memory is equivalent to 1D-LUT data corresponding to R. As a result, if R2 is given as address data in that memory, the corresponding value for R3 is output. For values of R2 that have not been stored in this manner, the corresponding R3 values are obtained by interpolation from a plurality of the values of R2 that are stored. In a similar manner, the 1D-LUT generation section 490 stores the correspondence between G2 and the value for G3 calculated from Equation 9, as well as the correspondence between B2 and the value for B3 calculated from Equation 10.

As described above, this embodiment of the present invention makes it possible to reproduce an appropriate brightness corresponding to the viewing environment, even if the ambient light 80 changes, without interrupting the display of the presentation image, by updating the 1D-LUT in the 1D-LUT storage section 404, based on environmental information for the non-display area 620.

The use of the area above the display area 610 as the non-display area 620 makes it possible to capture changes in the ambient light 80 accurately, without noise.

Hardware Description

Note that the hardware used for the above described components could be as described below, by way of example.

Figure 7:
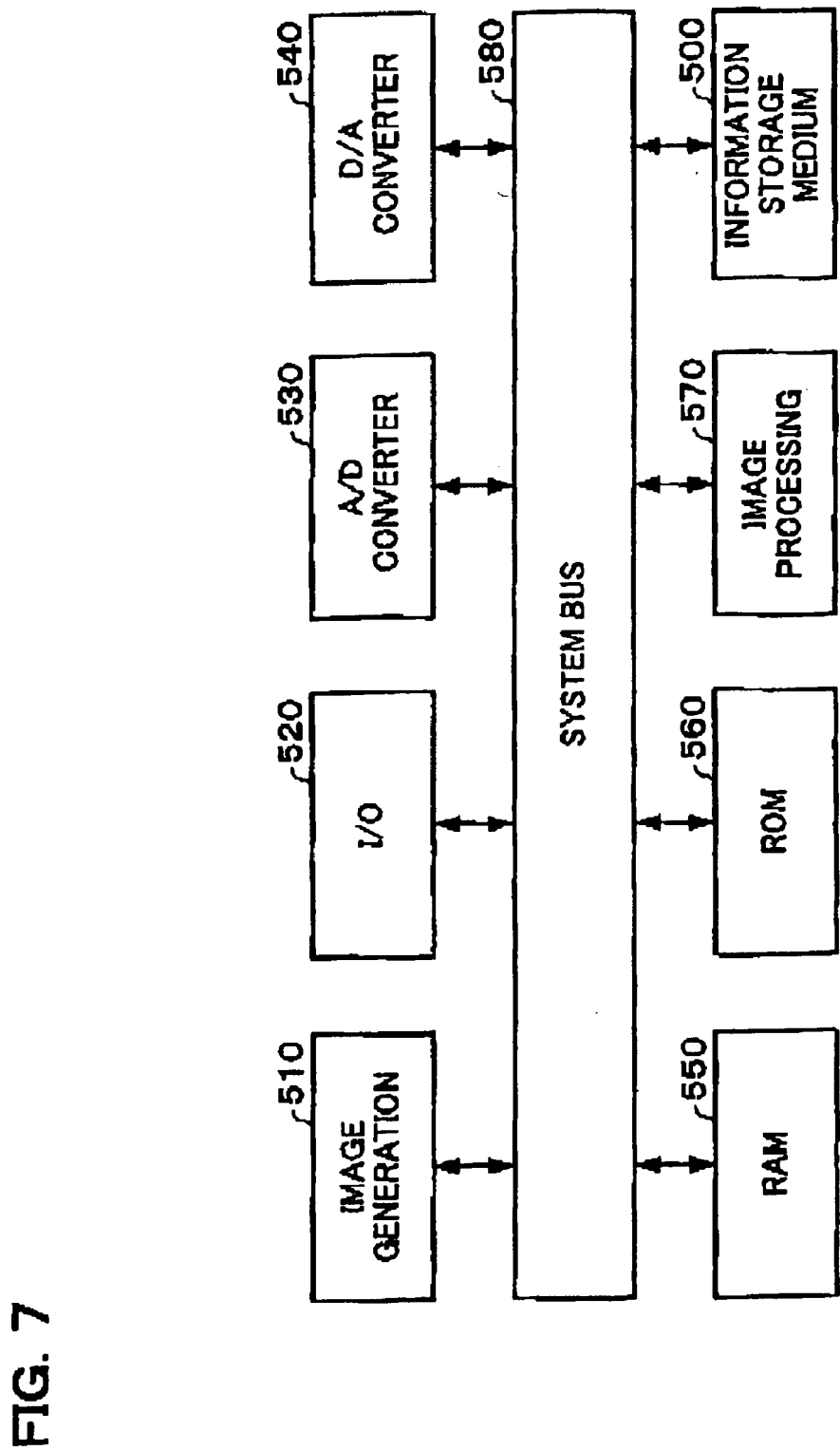
FIG. 7 is a hardware block diagram in accordance with an example of this embodiment.

A hardware block diagram of an example of this embodiment is shown in FIG. 7.

The configuration could be implemented by using an I/O section 520 (such as input-output ports) and an A/D converter 530 as the input signal processing section 401, an image generation circuit 510 or the like as the calibration image provider section 407, RAM 550 and a CPU 560 as the color control processing section 422, a D/A converter 540 or the like as the output signal processing section 405, a liquid-crystal light valve driver or the like as the drive section 594, an image processing circuit 570 and RAM 550 as the correction section 432, and a system timer as the timer section 434, by way of example. Note that these components are connected together by a system bus 580. These components could be implemented by hardware such as circuitry or they could be implemented by software such as drivers.

The functions of these components could also be implemented by the reading of a program from an information storage medium 500. Means such as a CD-ROM, DVD-ROM, ROM, RAM, or hard disk can be used as the information storage medium 500, and either a direct method or an indirect method could be used for reading that information.

Instead of the information storage medium 500, it is also possible to implement the above described functions by downloading a program for implementing those functions from a host device or the like, through a transfer path.

The present invention has been described above by way of an preferred embodiment thereof but it should be obvious to those skilled in the art that the application of the present invention is not limited to that embodiment.

Variations

In the embodiment described above, the sensor section 410 performed sensing at fixed time intervals, but it could also perform the sensing continuously. In such a case, the 1D-LUT could be updated whenever there is a large change in a factor such as the environmental information (X1, Y1, Z1) from the sensor section 410 or the ratio g of average values derived by the brightness change derivation section 460.

Of course, it is also possible to update the 1D-LUT continuously, not only if a predetermined change has occurred within a fixed time, or update the 1D-LUT in accordance with a human directive.

The area identification section 450 could base the identification of the areas on a difference in the environmental information (X1, Y1, Z1), or it could base it on a difference in luminance values obtained from environmental information. It should go without saying that the identification could be based on a comparative difference rather than a numerical difference.

Instead of the CCD sensor 417; a CMOS sensor or the like could be used as the sensor.

Similarly, the present invention can also be applied to presentations done by displaying images by a display means other than a projection means such as the previously described projector. Instead of a liquid-crystal projector, a display device such as a cathode ray tube (CRT), a plasma display panel (PDP), a field emission display (FED) device, an electro-luminescence (EL) device, or a direct-vision type of liquid crystal display device, or a projector using means such as a digital micromirror device (DMD), could be used as such a display means. Note that DMD is a trademark registered to Texas Instruments Inc. of the USA.

It should be obvious that the present invention would also be effective when displaying images in applications that are not presentations, such as in meetings, for medical treatment, in the design or fashion field, in business activities, commercials, and in education, as well as for general-purpose image displays such as movies, TV, video, and games.

If the input signals (R1, G1 and B1) are digital signals, the A/D converter section 440 would not be necessary, and if the output signals (R4, G4 and B4) are digital signals, the D/A converter section 441 would not be necessary either. This is preferably done as required in accordance with the input devices and output devices that are used.

Note that the functions of the previously described image processing section of the projector 20 could be implemented by a simple image display device (such as the projector 20 itself), or they could be implemented by being distributed between a plurality of processing devices (such as processing that is distributed between the projector 20 and a PC).

In the above embodiment, information in xyY (or Yxy) form is used as color information comprising brightness information, but it could equally well be in another format such as Lab, Luv, or LCh.

The above described environmental information could also be values that express color and brightness in a form such as xyY, but it could also be color and brightness correction amounts in a form such as $\Delta x \Delta y \Delta y$.

In addition, the embodiment described above related to application to a front-projection type of projector, but the present invention can equally well be applied to a rear-projection type of projector.

What is claimed is:

1. An image display system which corrects and displays an image, based on environmental information that represents a viewing environment, the image display system comprising:

correction display means for displaying a first calibration image represented by first image signal and also displaying a second calibration image represented by second image signal that is different from the first image signal;

sensor means for sensing the displayed first calibration image, the displayed second calibration image, and a display area of a normal image and a non-display area around the display area, and outputting first environmental information, second environmental information, and third environmental information, respectively;

area identification means for identifying the display area and the non-display area, based on the first environmental information and the second environmental information;

brightness change derivation means for storing one of the first and second environmental information of the non-display area as initial environmental information, and also for deriving brightness change information that expresses a change in brightness concomitant with a change in a viewing environment, based on a difference between the third environmental information and the initial environmental information;

grayscale correction parameter derivation means for deriving a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and correction data generation means for generating correction data which is used for correcting the brightness of an image, based on the grayscale correction parameter, wherein the grayscale correction parameter derivation means re-derives the grayscale correction parameter, based on the brightness change information, at a time-point at which a predetermined time has elapsed or a time-point at which a predetermined change has occurred in the third environmental information, wherein the correction data generation means regenerates the correction data, based on the grayscale correction parameter, and wherein the correction display means corrects and displays an image based on the correction data.

2. The image display system as defined in claim 1, wherein the brightness change derivation means uses a non-display area above the display area, as the non-display area.

3. An image display system which corrects and displays an image, based on environmental information that represents a viewing environment, the image display system comprising:

a correction display section which displays a first calibration image represented by first image signal and also displays a second calibration image represented by second image signal that is different from the first image signal;

a sensor section which senses the displayed first calibration image, the displayed second calibration image, and a display area of a normal image and a non-display area around the display area, and outputs first environmental information, second environmental information, and third environmental information, respectively;

an area identification section which identifies the display area and the non-display area, based on the first environmental information and the second environmental information;

a brightness change derivation section which stores one of the first and second environmental information of the non-display area as initial environmental information, and also derives brightness change information that expresses a change in brightness concomitant with a change in a viewing environment, based on a difference between the third environmental information and the initial environmental information;

a grayscale correction parameter derivation section which derives a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and a correction data generation section which generates correction data which is used for correcting the brightness of an image, based on the grayscale correction parameter, wherein the grayscale correction parameter derivation section re-derives the grayscale correction parameter, based on the brightness change information, at a time-point at which a predetermined time has elapsed or a time-point at which a predetermined change has occurred in the third environmental information, wherein the correction data generation section regenerates the correction data, based on the grayscale correction parameter, and wherein the correction display section corrects and displays an image based on the correction data.

4. A projector which corrects and projects an image based on environmental information that represents a viewing environment, the projector comprising;

correction display means for displaying a first calibration image represented by first image signal and also projecting a second calibration image represented by second image signal that is different from the first image signal;

sensor means for sensing the displayed first calibration image, the displayed second calibration image, and a display area of a normal image and a non-display area around the display area, and outputting first environmental information, second environmental information, and third environmental information, respectively;

area identification means for identifying the display area and the non-display area, based on the first environmental information and the second environmental information;

brightness change derivation means for storing one of the first and second environmental information of the non-display area as initial environmental information, and also for deriving brightness change information that expresses a change in brightness concomitant with a change in a viewing environment, based on a difference between the third environmental information and the initial environmental information;

grayscale correction parameter derivation means for deriving a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and correction data generation means for generating correction data which is used for correcting the brightness of an image, based on the grayscale correction parameter, wherein the grayscale correction parameter derivation means re-derives the grayscale correction parameter, based on the brightness change information, at a time-point at which a predetermined time has elapsed or a time-point at which a predetermined change has occurred in the third environmental information, wherein the correction data generation means regenerates the correction data, based on the grayscale correction parameter, and wherein the correction display means corrects and projects an image based on the correction data.

5. A projector which corrects and projects an image based on environmental information that represents a viewing environment, the projector comprising:
- a correction display section which displays a first calibration image represented by first image signal and also projects a second calibration image represented by second image signal that is different from the first image signal;
- a sensor section which senses the displayed first calibration image, the displayed second calibration image, and a display area of a normal image and a non-display area around the display area, and outputs first environmental information, second environmental information, and third environmental information, respectively;
- an area identification section which identifies the display area and the non-display area, based on the first environmental information and the second environmental information;
- a brightness change derivation section which stores one of the first and second environmental information of the non-display area as initial environmental information, and also derives brightness change information that expresses a change in brightness concomitant with a change in a viewing environment, based on a difference between the third environmental information and the initial environmental information;
- a grayscale correction parameter derivation section which derives a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and
- a correction data generation section which generates correction data which is used for correcting the brightness of an image, based on the grayscale correction parameter, wherein the grayscale correction parameter derivation section re-derives the grayscale correction parameter, based on the brightness change information, at a time-point at which a predetermined time has elapsed or a time-point at which a predetermined change has occurred in the third environmental information, wherein the correction data generation section regenerates the correction data, based on the grayscale correction parameter, and wherein the correction display section corrects and projects an image based on the correction data.

6. A program for correcting and displaying an image, based on environmental information that represents a viewing environment, wherein the program causes a computer to function as:
- display control means for causing a display of a first calibration image represented by first image signal on an image display means and also causing a display of a second calibration image represented by second image signal that is different from the first image signal on the image display means;
- sensor control means for causing a sensing of the first and second calibration images together with a display area of a normal image and a non-display area around the display area by a sensor means, and causing an output of first environmental information, second environmental information, and third environmental information, to the sensor means;
- area identification means for identifying the display area and the non-display area, based on the first environmental information and the second environmental information;
- brightness change derivation means for storing one of the first and second environmental information of the non-display area as initial environmental information, and also for deriving brightness change information that expresses a change in brightness concomitant with a change in a viewing environment, based on a difference between the third environmental information and the initial environmental information;
- grayscale correction parameter derivation means for deriving a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and
- correction data generation means for generating correction data which is used for correcting the brightness of an image, based on the grayscale correction parameter, wherein the grayscale correction parameter derivation means re-derives the grayscale correction parameter, based on the brightness change information, at a time-point at which a predetermined time has elapsed or a time-point at which a predetermined change has occurred in the third environmental information, wherein the correction data generation means regenerates the correction data, based on the grayscale correction parameter, and wherein the display control means corrects the image, based on the correction data, and causes the display thereof on the image display means.

7. The program as defined in claim 6, wherein the brightness change derivation means uses a non-display area above the display area, as the non-display area.

8. An information storage medium storing a computer readable program, wherein the program causes a computer to function as:
- display control means for causing a display of a first calibration image represented by first image signal on an image display means and also causing a display of a second calibration image represented by second image signal that is different from the first image signal on the image display means;
- sensor control, means for causing a sensing of the first and second calibration images together with a display area of a normal image and a non-display area around the display area by a sensor means, and causing an output of first environmental information, second environmental information, and third environmental information, to the sensor means;
- area identification means for identifying the display area and the non-display area, based on the first environmental information and the second environmental information;
- brightness change derivation means for storing one of the first and second environmental information of the non-display area as initial environment information, and also for deriving brightness change information that expresses a change in brightness concomitant with a change in a viewing environment, based on a difference between the third environmental information and the initial environmental information;

grayscale correction parameter derivation means for deriving a grayscale correction parameter, based on an average luminance value of each pixel in the display area during the displays of the first and second calibration images in an ideal environment and an average luminance value of each pixel in the display area during the displays of the first and second calibration images in the actual environment, which is based on the first and second environmental information; and correction data generation means for generating correction data which is used for correcting the brightness of an image, based on the grayscale correction parameter, wherein the grayscale correction parameter derivation means re-derives the grayscale correction parameter, based on the brightness change information, at a time-point at which a predetermined time has elapsed or a time-point at which a predetermined change has occurred in the third environmental information, wherein the correction data generation means regenerates the correction data, based on the grayscale correction parameter, and wherein the display control means corrects the image, based on the correction data, and causes the display thereof on the image display means.

9. An image processing method of correcting the image, based on environmental information that represents a viewing environment, the image processing method comprising:

displaying a first calibration image represented by first image signal;

sensing the displayed calibration image and outputting the result as first environmental information;

displaying a second calibration image represented by second image signal that is different from the first image signal;

sensing the displayed calibration image and outputting the result as second environmental information;

identifying a display area and a non-display area, based on the difference between the first and second environmental information;

storing one of the first and second environmental information of the non-display area in a predetermined storage region as initial environmental information;

deriving a grayscale correction parameter, based on an average luminance value of each pixel in the display area during the displays of the first and second calibration images in an ideal environment and an average luminance value of each pixel in the display area during the displays of the first and second calibration images in the actual environment;

generating correction data based on the grayscale correction parameter;

correcting the image data to display a normal image, based on the correction data;

sensing the displayed normal image and outputting the result as third environmental information;

deriving brightness change information that represents a change in brightness concomitant with a change in the viewing environment, based on the third environmental information for the non-display area during the display of the normal image and the initial environmental information, at a time-point at which a predetermined time has elapsed or a time-point at which a predetermined change has occurred in the third environmental information;

re-deriving the grayscale correction parameter, based on the brightness change information;

regenerating the correction data, based on the grayscale correction parameter; and displaying corrected image data, based on the correction data.

10. The image processing method as defined in claim 9, wherein:

the non-display area is a non-display area above the display area.

* * * * *